Dec. 5, 1939.  W. G. DUNN  2,182,224
WIND DRIVEN GENERATOR DISTRIBUTOR MECHANISM
Filed Sept. 28, 1938  2 Sheets-Sheet 2
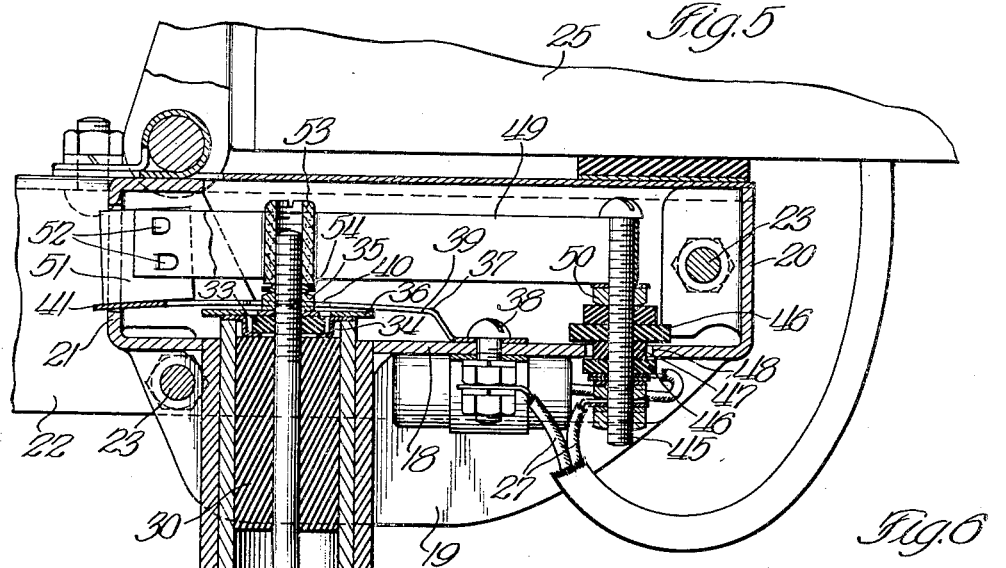
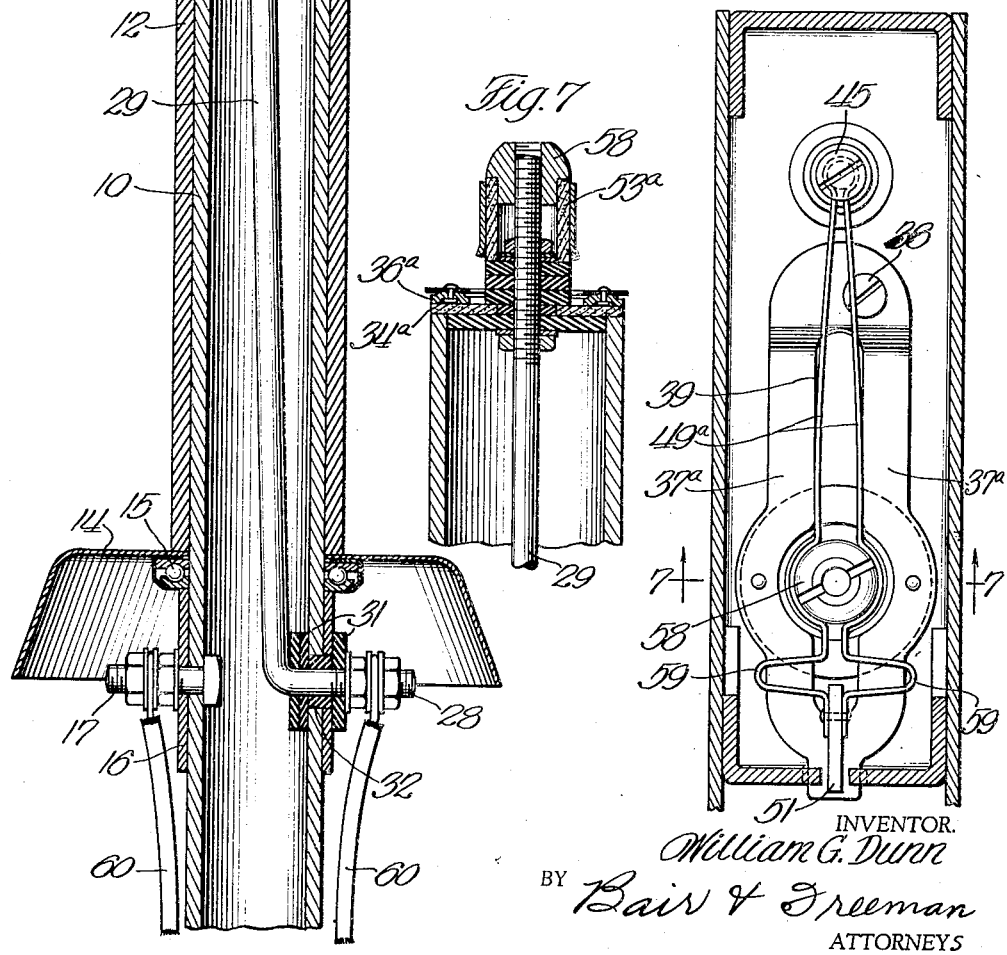
INVENTOR.
William G. Dunn
BY Bair & Freeman
ATTORNEYS Patented Dec. 5, 1939

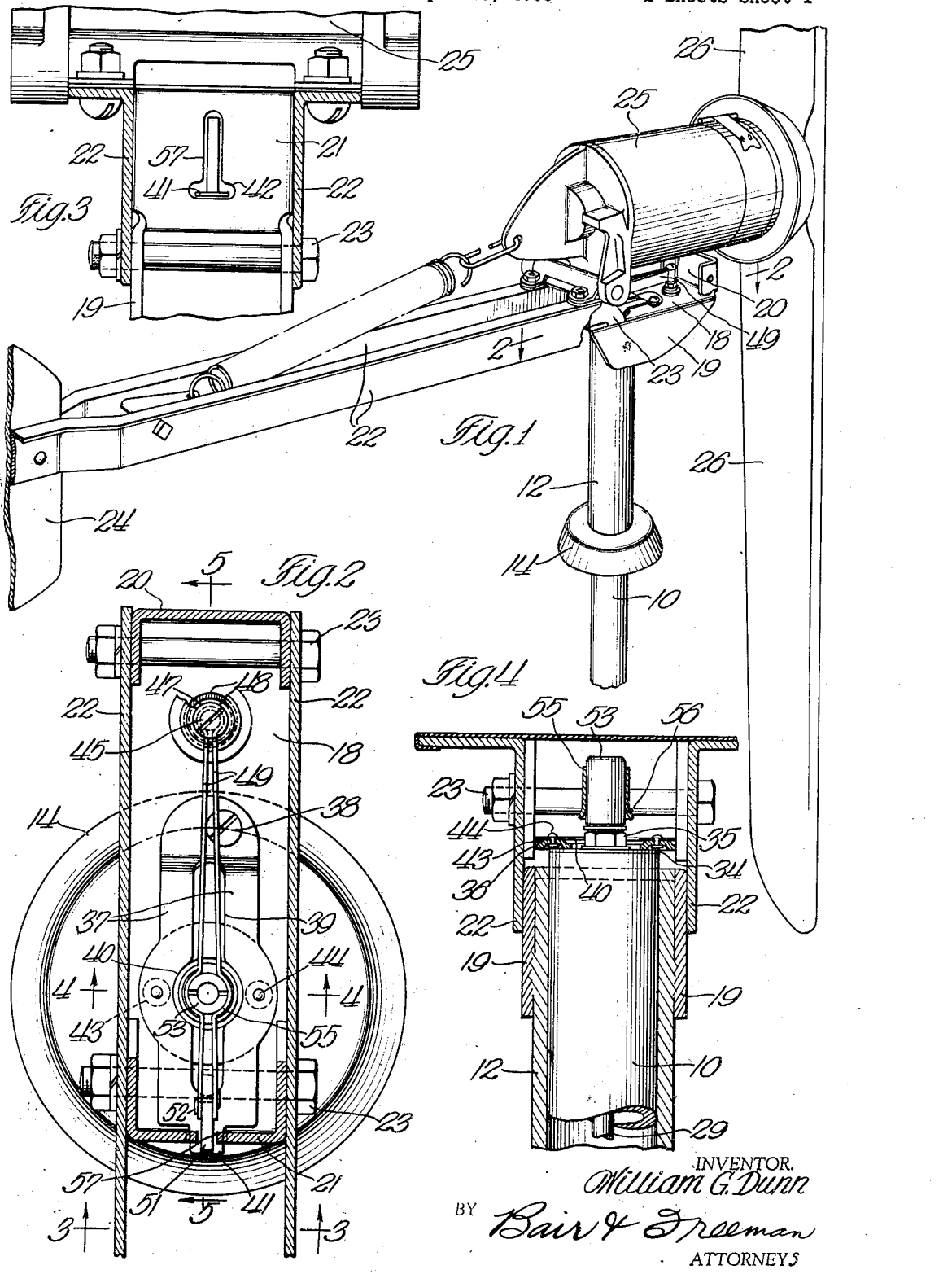

2,182,224

UNITED STATES PATENT OFFICE 2,182,224

WIND DRIVEN GENERATOR DISTRIBUTOR MECHANISM

William G. Dunn, Clarinda, Iowa

Application September 28, 1938, Serial No. 232,119

16 Claims. (Cl. 173—324)

An object of my present invention is to provide distributor mechanism particularly adaptable for use in connection with wind driven generator structures and effective to transmit electric current efficiently from the generator to the tower on which the generator is rotatably mounted so that the propeller which drives the generator can face the wind.

More particularly it is my object to provide distributor mechanism which is of rugged construction, yet which can be made inexpensively as it eliminates the necessity of accurately machining and aligning the various parts thereof which rotate relative to each other, yet full surface contact is had throughout the rotating movement of a sleeve and supporting member relative to a supporting pipe or tube.

Still another object is to provide distributor mechanism in which there is relatively high spring tension with a minimum surface travel between the parts.

Another object is to provide a distributor mechanism in which graphite bronze bushings and washers are used, which eliminate the necessity of lubrication which ordinarily interferes with the transmission of electric current from one surface to another of a distributor mechanism in which such surfaces move relative to each other.

Still a further object is to provide means for floatingly mounting a contact washer and a pair of contact leaf springs so that all undesirable binding is entirely eliminated.

The foregoing, other and further objects of the invention will be apparent from the following description, accompanying drawings and appended claims. Embodiments of the invention are illustrated in the accompanying drawings in which the views thereof are as follows:

Figure 1 is a perspective view of a wind driven generator including my distributor mechanism with a portion of a rear side angle bar broken away to show the distributor mechanism mounted on the supporting head of the structure;

Figure 2 is an enlarged plan view of the distributor mechanism showing parts of the wind driven generator in section as on the line 2—2 of Figure 1;

Figure 3 is a sectional view on the line 3—3 of Figure 2;

Figure 4 is a sectional view on the line 4—4 of Figure 2;

Figure 5 is a sectional view on the line 5—5 of Figure 2;

Figure 6 is a plan view similar to Figure 2, showing a modified construction for handling heavier currents, and Figure 7 is a sectional view thereof on the line 7—7 of Figure 6.

On the accompanying drawings I have used the reference numeral 10 to indicate a supporting tube such as one at the top of a tower for supporting a wind driven generator. A sleeve 12 is rotatable thereon and rests against a cover member 14 which, in turn, is supported by a ball thrust bearing 15. The bearing 15 is supported on a shoulder of the tube 10 formed by a sleeve 16 held in position by a terminal bolt 17.

The sleeve 12 has a support in the form of a platform 18 welded to its upper end. Flanges 19 depend from the sides of the platform 18 for bracing the platform relative to the sleeve. An upstanding flange 20 is provided at the front end of the platform 18 and an upstanding flange 21 is provided at the rear end thereof.

Angle bars 22 are secured to the platform 18 by means of bolts 23, and they support a vane 24 for aligning the angle bars with the direction of the wind. A generator 25 is mounted on the angle bars 22 and is driven by a propeller 26. A generator of this character is fully shown in detail in my copending application, Serial No. 191,715, filed February 21, 1938, and accordingly will not be further described in connection with the present invention except as it releates thereto.

A distributor mechanism for conducting current from the generator 25, through wires 27 to the terminal 17 and a second terminal 28 mounted under the cover 14, form the subject-matter of my present invention and will now be described. The terminal member 28 is formed on the lower end of a rod 29 extending through an insulation bushing 30 in the upper end of the tubular support 10. The terminal 28 and the rod 29 are suitably insulated from the tubular support 10 by insulating washers 31 and insulation bushings 32 at the lower end. An insulation washer 33 is provided at the upper end and is seated in a depressed central portion of a washer 34. A nut 35 on the rod 29 retains the washers 33 and 34 in tight electrical contact with the upper end of the tubular support 10.

The upper surface of the washer 34 constitutes a collector ring, with which a second collector ring or washer 36 cooperates. The washer 36 is resiliently engaged with the washer 34 by a leaf spring 37 anchored and grounded by a bolt 38 to the platform 18. The leaf spring 37, as shown in Figure 6, has a central slot 39 (Figure 2) and an enlarged opening 40 surrounding the nut 35. The free end of the leaf spring has a reduced portion indicated at 41 located in an enlarged opening 42 (see Figures 2 and 3). The enlarged opening 42 provides for a floating mounting of the leaf spring 37 and places it under tension, as shown by the curvature illustrated in Figure 5, so that it urges the washer 36 to engage the washer 34 as shown in Figure 4.

The washer 36 has upstruck portions 43 riveted as at 44 to the leaf spring 37 whereby the washer is carried by the leaf spring but has some floating movement relative thereto whereby it will at all times properly seat against the washer 34, regardless of whether or not the washer lies in a plane at right angles to the axis on which the platform 18 revolves.

One of the circuit wires 27 from the generator 25 is connected to the terminal screw 38, while the other one is connected to a terminal screw 45. The terminal screw 45 is floatingly mounted relative to the platform 18 and insulated therefrom by means of washers 46 and a bushing 47. The bushing 47 extends through an enlarged opening 48 in the platform and is longer than the thickness of the platform, as shown in Figure 5. This provides a floating mounting for the screw 45, whereas it is rigidly connected with a pair of leaf springs 49. The rigid connection is effected by a nut 50 on the screw 45.

The leaf springs 49 may be formed of a single strip of spring material having an eye portion around the screw 45 as shown in Figure 2. The free ends thereof are connected by a positioning block 51, preferably formed of fibre or other insulating material. Tongues 52 may be cut from the material of the leaf springs 49 and extended through the positioning block 51 and bent over for this purpose.

A bushing 53 is threaded on the upper end of the rod 29 against a lock washer 54. The bushing 53 is resiliently engaged between arcuate portions 55 of the leaf springs 49, as shown in Figures 2 and 4. When the sleeve 12 and its platform 18 are placed in position on the tubular support 10, the arcuate portions 55 (being closer together than the distance across the bushing 53) may be caused to spread to fit the bushing by outwardly flared portions 56 on the lower edges of the leaf springs.

Referring to Figure 3, the enlarged opening 42 terminates adjacent its upper edge in an enlarged slot 57 adapted to receive the positioning block 51. Since the slot 57 is larger than the cross-section of the block, a floating mounting is provided which in conjunction with the floating mounting of the screw 45 permits conformation of the leaf springs 49 to the bushing 53 during rotation of the wind driven generator relative to its stationary tubular support 10. Such conformation will occur even though the bushing 53 is slightly out of alignment with the axis of rotation of the generator about the support. The bushing 53 and either of the washers 34 or 36 may be formed of a graphite bronze composition to eliminate the necessity of lubrication. The possibility of a poor electrical contact because of an oil film is thereby avoided. The parts are thus self-lubricating and long wearing. They will last the life of the wind driven generator unit without the necessity of periodic oiling.

In some instances it is desirable to have greater contact area for carrying heavier currents. In Figures 6 and 7, I show a modified construction in which the modified parts similar to those already described have the same reference numerals with the addition of *a*. A bushing 53a is retained in position by a cap nut 58 instead of the bushing being threaded on the rod 29. A larger washer 34a is also provided and the washer 36a enlarged to fit it. Likewise the leaf spring 37a is larger in its portion that registers with the washer 36a. To secure additional spring tension of leaf springs 49a, laterally extending corrugations 59 have been provided, which increase the effective length of the springs without increasing the actual length between the terminal screw 45 and the connector element 51.

My construction provides a relatively high spring tension between the contacts of the moving and stationary members of the distributor mechanism. In addition to long spring mountings for the contact parts, there is a flexible or full floating mounting of the springs so that in the event there is any looseness or variation of sizes of the parts during manufacture and assembly there will be no riding of the contacts on the high side and absence of contact on the low side but, instead, a full contact throughout the contact surfaces. Any eccentricity of the bushing 53 will be followed by the springs 49 with full contact between them and the bushing at all times. The flexible mounting secured by my arrangement provides efficient transmission of electrical current from the generator structure to the wires 60 connected with the terminals 17 and 28 and which wires extend on to the load.

My invention has been described in the foregoing specification and illustrated in the drawings more or less precisely as to details. It is to be understood, however, that changes may be made in the arrangement and proportions of parts and equivalents may be substituted, without departing from the spirit and scope of the invention as set forth in the appended claims.

What I claim and desire to secure by Letters Patent of the United States is:

1. In a distributor mechanism, a tubular support, a sleeve mounted rotatably thereon, a supporting member carried by said sleeve, a contact washer at the top of said tubular support, a second contact washer engaged therewith, a leaf spring mounted on said supporting member and engaging said second washer with said first washer to establish a circuit connection, said second washer being floatingly mounted relative to said leaf spring, a contact bushing extending upwardly from the top of said tubular support, and a pair of leaf springs carried by said supporting member and resiliently engaging opposite sides of said contact bushing to establish a second circuit connection, said pair of contact leaf springs being floatingly mounted relative to said supporting member.

2. In a distributor mechanism, a tubular support, a sleeve mounted rotatably thereon, a supporting platform carried by said sleeve, a contact washer at the top of said tubular support, a second contact washer engaged therewith, a leaf spring mounted on said platform and engaging said second washer with said first washer to establish a circuit connection, a contact bushing extending upwardly from the top of said tubular support, and a pair of leaf springs carried by said supporting member and resiliently engaging opposite sides of said contact bushing to establish a second circuit connection.

3. In a distributor mechanism, an upright tube, a sleeve mounted rotatably thereon, a contact washer at the top of said tube, a second contact washer engaged therewith, said second washer having a pair of opposite protuberances, a leaf spring carried by said sleeve and engaging said protuberances to cause floating engagement of said second washer with said first washer and thereby establish a circuit connection, a contact bushing extending upwardly from the top of said tube, a leaf spring carried by said sleeve and resiliently engaging said contact bushing to establish a second circuit connection, said leaf spring extending in opposite directions from said bushing, and means for loosely mounting the ends thereof relative to said sleeve.

4. In a wind driven generator distributor mechanism, a supporting member rotatably mounted, a pair of contacts comprising a stationary washer and a stationary bushing, cooperating contacts carried by said supporting member comprising a second washer to coact with said stationary washer and a leaf spring engaging said stationary bushing, a second leaf spring having one of its ends connected to said supporting member, said second leaf spring being connected with said second washer to bias it to engagement with said stationary washer, and a terminal member connected with one end of said first leaf spring, said terminal member extending loosely through said supporting member, the other end of said first leaf spring being loosely associated with said supporting member and the other end of said second leaf spring being loosely associated with said supporting member whereby to permit conformation of said first leaf spring and said second washer to the contour and inclination of the contact surfaces respectively of said bushing and said first washer.

5. In a wind driven generator distributor mechanism, a supporting member rotatably mounted, a pair of contacts comprising a stationary washer and a stationary bushing, cooperating contacts carried by said supporting member comprising a second washer to coact with said stationary washer and a leaf spring engaging said stationary bushing, a second leaf spring mounted on said supporting member and connected with said second washer to bias it to engage said stationary washer, and a terminal member connected with one end of said first leaf spring, said terminal member extending loosely through said supporting member and the other end of said first leaf spring being loosely associated with said supporting member whereby to permit conformation of said first leaf spring to the contour and inclination of the contact surface of said bushing.

6. In a wind driven generator distributor mechanism, a supporting member rotatably mounted, a pair of contacts comprising a stationary washer and a stationary bushing, cooperating contacts carried by said supporting member comprising a second washer to coact with said stationary washer and a pair of leaf springs engaging opposite sides of said stationary bushing and a third leaf spring having one end mounted on said supporting member and its intermediate portion connected with said second washer to bias it to engage with said stationary washer, the other end of said third leaf spring being loosely associated with said supporting member whereby to permit conformation of said second washer to the contour and inclination of the contact surface of said first washer.

7. In a distributor mechanism, a supporting member rotatably mounted, a pair of contacts comprising a stationary washer and a stationary bushing and cooperating contacts carried by said supporting member comprising a second washer and a pair of leaf springs engaging the first washer and opposite sides of the bushing respectively and means for floatably mounting said second washer, said means comprising a third leaf spring mounted on said supporting member and connected with said second washer to bias it to engage said stationary washer.

8. In a distributor mechanism, a supporting member rotatably mounted, a pair of contacts comprising a stationary washer and a stationary bushing and cooperating contacts carried by said supporting member comprising a second washer and a pair of leaf springs engaging the first washer and opposite sides of the bushing respectively, and means for loosely mounting said pair of leaf springs relative to said supporting member so that they follow the contour of said stationary bushing, said means including a post fixed to one end of said pair of leaf springs, said post being loosely mounted in an oversize opening in said support, said means including also a positioning block affixed to the other end of said pair of leaf springs and passing through an opening in said support.

9. In a distributor mechanism, a supporting member rotatably mounted, a pair of contacts comprising a stationary washer and a stationary bushing and cooperating contacts carried by said supporting member comprising a second washer and a pair of leaf springs engaging the first washer and opposite sides of the bushing respectively, a third leaf spring having one end secured to said supporting member, said supporting member having an enlarged opening for receiving the other end thereof, said third leaf spring being connected with said second washer by a connection that permits rocking motion of the washer relative to said third spring, a terminal element connected with one end of said pair of leaf springs and a positioning element fixed to the other end thereof, said supporting member having enlarged openings receiving said terminal element and said positioning element respectively, said pair of leaf springs each having a laterally extending corrugation therein to increase the effective length thereof.

10. In a distributor mechanism, a supporting member rotatably mounted, a pair of contacts comprising a stationary washer and a stationary bushing and cooperating contacts carried by said supporting member comprising a second washer and a pair of leaf springs engaging the first washer and opposite sides of the bushing respectively, a third leaf spring having one end secured to said supporting member, said third leaf spring being connected with said second washer by a connection that permits rocking motion of the washer relative to said third spring, said pair of leaf springs each having a laterally extending corrugation therein to increase the effective length thereof.

11. In a distributor mechanism, a supporting member rotatably mounted, a pair of contacts comprising a stationary washer and a stationary bushing and cooperating contacts carried by said supporting member comprising a second washer and a pair of leaf springs engaging the first washer and opposite sides of the bushing respectively, a third leaf spring having one end secured to said supporting member, said supporting member having an enlarged opening for receiving the other end thereof, said third leaf spring being connected with said second washer by a connection that permits rocking motion of the washer relative to said third spring, a terminal element connected with one end of said pair of leaf springs and a positioning element fixed to the other end thereof, said supporting member having enlarged openings receiving said terminal element and said positioning element respectively.

12. In a distributor mechanism, a supporting member rotatably mounted, a pair of contacts comprising a stationary washer and a stationary bushing and cooperating contacts carried by said supporting member comprising a second washer engaging the first washer and a pair of leaf springs engaging opposite sides of the bushing, a third leaf spring connected with said second washer to engage it with said stationary washer, said pair of leaf springs having flared portions adapted to center the leaf springs relative to the bushing during assembly.

13. In a distributor mechanism, a supporting member rotatably mounted, a pair of contacts comprising a stationary washer and a stationary bushing and cooperating contacts carried by said supporting member comprising a second washer and a pair of leaf springs engaging the first washer and opposite sides of the bushing respectively, a third leaf spring having one end secured to said supporting member, said supporting member having an enlarged opening for receiving the other end thereof, said second washer being engaged with said first washer by said third leaf spring, a terminal element connected with one end of said pair of leaf springs, said supporting member having an enlarged opening receiving said terminal element, said pair of leaf springs having flared portions adapted to center the leaf springs relative to the bushing during assembly.

14. In a distributor assembly, a supporting tube, a sleeve rotatable thereon, a supporting member carried by said sleeve, a contact washer on the upper end of said supporting tube, a bushing extending above said washer, a leaf spring connected with said supporting member and carrying a second washer for contact with said first washer, means for placing said leaf spring under tension comprising an opening in said supporting member loosely receiving an end of said leaf spring beyond the washer, a pair of leaf springs engaging opposite sides of said bushing, a terminal element connected with one end of said pair of leaf springs and extending loosely through an enlarged opening in said supporting member, and a positioning element connected with the opposite ends of said pair of leaf springs and extending loosely through an enlarged opening of said supporting member, the lower edges of said pair of leaf springs being flanged to spread the springs when assembling them over said bushing.

15. In a distributor assembly, a supporting tube, a sleeve rotatable thereon, a supporting member carried by said sleeve, a contact washer on the upper end of said supporting tube, a bushing extending above said washer, a leaf spring connected with said supporting member and carrying a second washer for contact with said first washer, means for placing said leaf spring under tension comprising an opening in said supporting member loosely receiving an end of said leaf spring beyond the washer, a pair of leaf springs engaging opposite sides of said bushing, and a terminal element connected with said pair of leaf springs.

16. In a distributor assembly, a supporting tube, a sleeve rotatable thereon, a supporting member carried by said sleeve, a pair of stationary contact members at the upper end of said supporting tube, a leaf spring connected with said supporting member and carrying a contact to coact with one of said pair of contacts, a pair of leaf springs engaging opposite sides of the other of said pair of contacts, a terminal element connected with one end of said pair of leaf springs and extending loosely through an enlarged opening in said supporting member, and an insulating element connected with the opposite ends of said pair of leaf springs and extending loosely through an enlarged opening of said supporting member.

WILLIAM G. DUNN.